Figure 1:
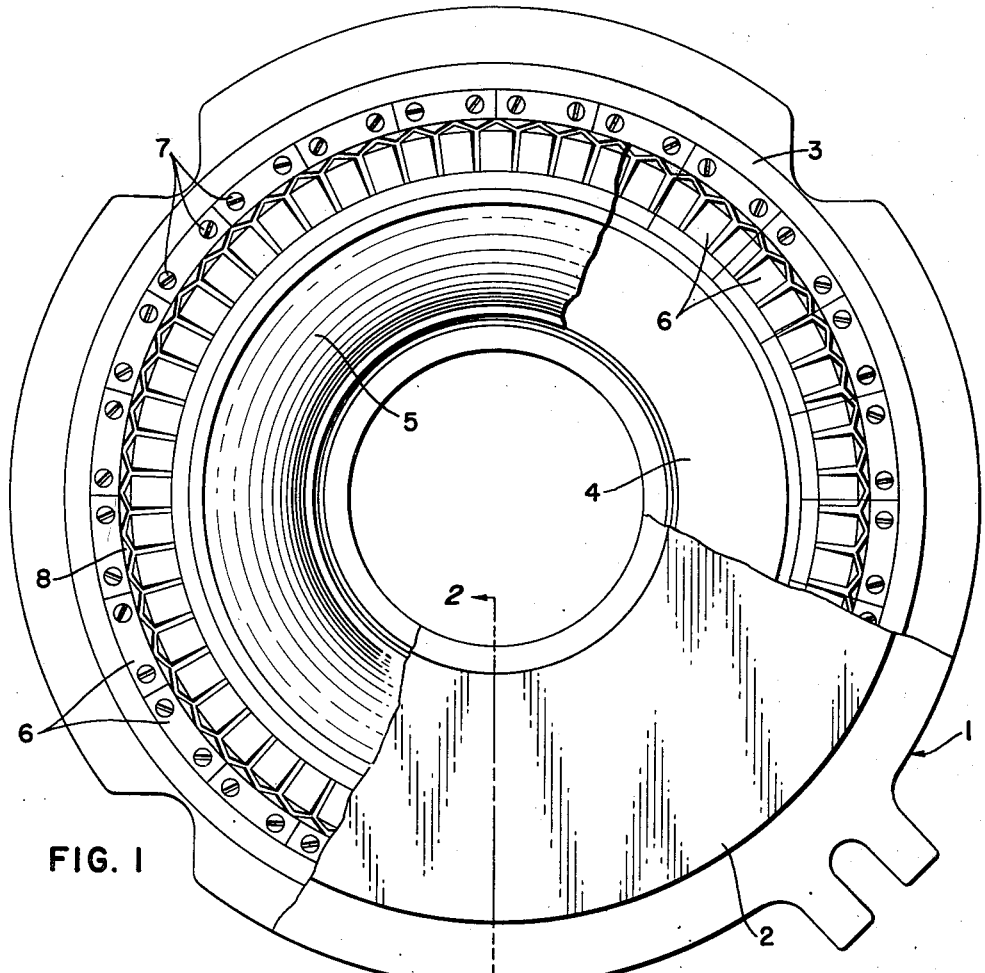

Oct. 8, 1957            J. TORREY, JR            2,808,621

METHOD OF AND APPARATUS FOR MANUFACTURING ANTI-SKID TIRES

Filed Nov. 17, 1951            2 Sheets-Sheet 1

INVENTOR.
JOSEPH TORREY, JR
BY
ATTORNEY

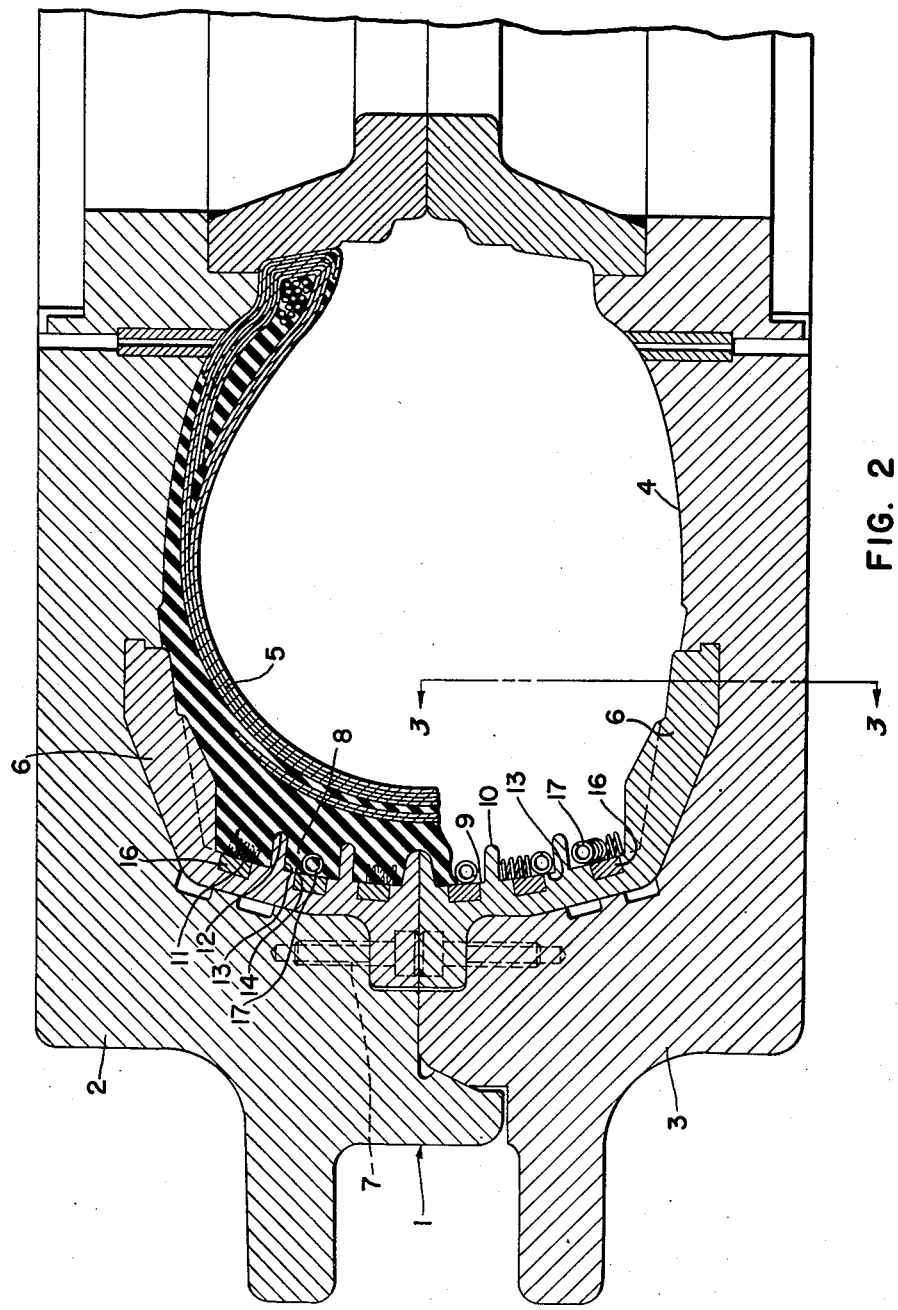

United States Patent Office 2,808,621
Patented Oct. 8, 1957

2,808,621

METHOD OF AND APPARATUS FOR MANUFACTURING ANTI-SKID TIRES

Joseph Torrey, Jr., Akron, Ohio, assignor, by mesne assignments, to The Goodyear Tire & Rubber Company, a corporation of Ohio Application November 17, 1951, Serial No. 256,847

5 Claims. (Cl. 18—38)

The present invention relates to a novel process and apparatus for the manufacture of anti-skid pneumatic tires. More particularly, the invention pertains not only to the vulcanizing mold which is specially equipped for temporarily retaining a multiplicity of metallic friction elements in place in the tread area of the mold so that when an unvulcanized tire is inserted therein the friction elements will be transferred to and embedded in the tire, but also to the method of accomplishing that result.

In the manufacture of anti-skid pneumatic tires, it has been found to be desirable to employ a very large number of metallic friction elements embedded in the tread portion of the tire during vulcanization. These friction elements may take any of several different forms such, for example, as short segments of steel spring, small stampings, chips or blocks of ferrous metal, etc., which may or may not be brass plated.

The size of the elements is limited only by the size of the design features in the mold. If steel spring segments are employed, they should be of a size ranging from approximately ¼ to ¾ inches in length and having a diameter of about ³⁄₁₆ inch. It is most advantageous to have the friction elements be small in order that they may be disposed in the body of the rubber of the raised lugs, buttons, or other embossed portions comprising the tread pattern.

It is ordinarily a rather laborious, difficult, and cumbersome procedure to embed various forms of metallic friction elements in a tire to insure achievement of the desired results. The method and apparatus of the present invention greatly facilitates the manufacturing operation and saves considerable time and effort, thereby effectively reducing the production cost for such tires.

It is, therefore, an object of the present invention to provide a successful and advantageous method of and apparatus for manufacturing anti-skid pneumatic tires having a multiplicity of metallic friction elements embedded in the tread thereof.

It is a further object of the present invention to provide a simple vulcanizing mold construction which will enable the metallic friction elements to be temporarily maintained in position therein for transfer to the tread portion of the tire.

It is a still further object of the invention to establish a plurality of magnetic fields of attraction in the tread forming portion of the vulcanizing mold to hold temporarily the metallic friction elements to insure their being transferred to and embedded in the tread portion of the tire at predetermined positions.

Other important objects and advantages of the invention will become apparent as the description of one form of mold structure illustrated in the accompanying drawings and embodying the teachings of the present invention proceeds.

Figure 3:
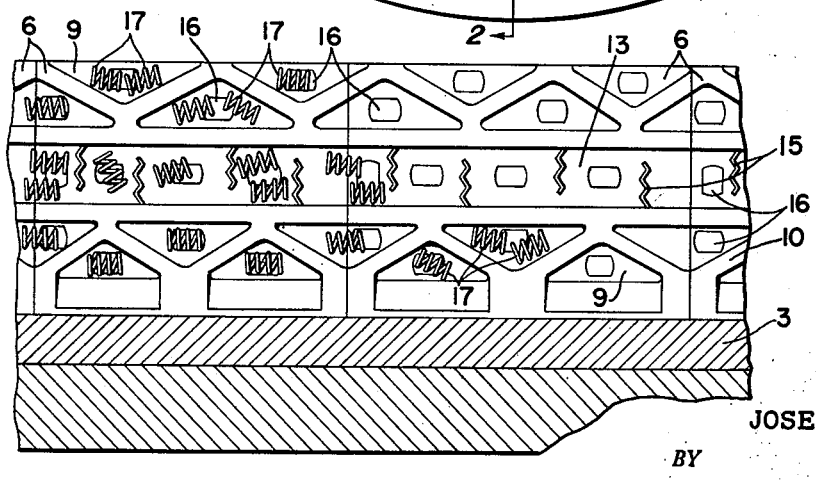

In the drawings, Fig. 1 represents a plan view of a tire vulcanizing mold with a tire therein and having parts removed and broken away. Fig. 2 is a vertical cross-section taken along the line 2—2 in Fig. 1. Fig. 3 is a partial plan view with portions thereof in section as seen from the line 3—3 in Fig. 2.

In Fig. 1, the reference character 1 identifies the vulcanizing mold generally. The mold 1 comprises the upper and lower mating rings 2 and 3, respectively. The mating rings 2 and 3 of the mold 1 cooperate in the manner illustrated in Fig. 2 to form a mold cavity 4 into which an unvulcanized tire 5 is inserted for the vulcanizing operation. In conventional practice, the tire 5 is built on a flat drum (not shown) in generally cylindrical form and shaped into a torus by the use of suitable shaping means such as an inflatable air bag (not shown) which is generally similar to an inner tube and usually of heavier construction to achieve the shaping of the tire. Other forms of shaping means including curing tubes, bladders, and the like may also be employed.

The mold 1 may take any of several different forms. The mating rings 2 and 3 of the mold may be of a type embodying a continuous annular construction forming the matrix which has the pattern of the finished tire therein or may comprise a base ring to which a number of individual segmental inserts 6 are secured. The procedure to be described herein may be advantageously applied to either type of mating ring. Moreover, it is immaterial whether the mating rings 2 and 3 are formed of ferrous or non-ferrous material.

The mating rings 2 and 3 of the mold 1 have mounted therein a plurality of segmental inserts 6 which are cast from aluminum or other suitable metal in the general cross-sectional shape shown in Fig. 2 and secured to each mating ring as by means of the set screws 7. Each segmental insert 6 has the pattern of the tire tread portion 8 detailed therein and defined by a plurality of recesses or depressions 9 isolated or spaced from each other by the intersecting embossed designs 10 which form the raised lugs, buttons, or embossed portions 11 and the grooves 12, respectively, of the finished tire 5. A part of a tire 5 is shown in place in the mold 1 with a portion of the design at the shoulder portion transferred from the upper mating ring 2. All of the aforementioned features may be altered as may be required by the specific design employed without affecting the inventive concept.

The circumferentially extending depression 13 will form on the tread portion 8 of the finished tire 5 a continuous rib 14. As another feature of the illustrated design, a plurality of spaced blades 15 are secured in place in and extending transversely only part way across the depression 13 in such fashion that successive blades will extend from alternate sides of the depression in the manner shown in Fig. 3. In this way the rib 14 formed in the finished tire 5 will actually be continuous, but will possess some degree of lateral flexibility due to the molded slots formed therein by the several blades 15.

As will be seen from Figs. 2 and 3, a plurality of fields of magnetic attraction are created in each segmental insert 6 by casting or otherwise fitting in place therein a number of permanent magnets 16. The magnets 16, which may conveniently take the form of Alnico magnets or their equivalent, are advantageously positioned in the depressions 9, 13 with the surface thereof flush with the bottom wall of the depression, the magnets disposed in the depressions 13 being positioned between adjacent spaced blades 15.

These magnets 16 are positioned substantially in the locations where it is desired to have the friction elements in the tread portion 8 of the finished tire 5.

The metallic friction elements 17, which may take any of several different forms, are shown in Figs. 2 and 3 as being segments of coil spring material. These friction elements 17 are advantageously relatively stiff steel springs which have been brass plated and/or otherwise formed or treated to insure a maximum bond with the rubber of the tire 5. A large number of friction elements 17 are promiscuously introduced to the interior of the mold 1 and the several magnets 16 therein will attract a number of them, temporarily holding them in place in the depressions 9, 13 of the individual segments 6.

The supply of friction elements 17 in the mold 1 may be shifted about therein by using a soft brush (not shown), an air blast, or other suitable means to insure that each depression 9, 13 of the individual segments 6 has the necessary number of friction elements. Thereafter, the excess friction elements 17 in the mold 1 are carefully removed to avoid dislodging the ones temporarily held in place in the depressions 9, 13. Next, an unvulcanized tire is placed in the mold 1 and under the influence of heat and pressure, the rubber of the tread portion will be caused to flow in and around the several metallic inserts 17 so as to cause them to become embedded in the rubber of the tread portion 8 of the finished tire 5.

It will be understood that the same method and apparatus may be advantageously employed in imparting anti-skid properties to retreaded or recapped tires. In other words, it is readily possible to apply a new tread portion to a worn tire in a retread mold embodying the teachings of the present invention.

While certain representative embodiments and details have been shown for the purpose of illustrating the invention, it will be apparent to those skilled in this art that various changes and modifications may be made therein without departing from the spirit or scope of the invention.

I claim:

1. In the manufacture of an anti-skid pneumatic tire, the method of employing a vulcanizing mold for incorporating in the tread portion of the tire a multiplicity of metallic friction elements, said method comprising the steps of providing a plurality of magnets in the recesses of and forming a part of the tread forming portion of the mold; introducing the several metallic friction elements shorter in length than said recesses to the several fields of said magnets and shifting said elements within said mold, whereby the elements are temporarily held in the recesses of said magnets; removing from said mold the excess friction elements loosely disposed therein; placing a tire in the mold; and subjecting the mold to heat and pressure, whereby the metallic friction elements will be transferred and embedded in the finished tire.

2. In the manufacture of an anti-skid pneumatic tire, the method of employing a vulcanizing mold for incorporating in the tread portion of the tire a multiplicity of metallic friction elements, said method comprising the steps of providing a plurality of magnets in the recesses of and forming a part of the tread forming portion of the mold; distributing a supply of the metallic friction elements shorter in length than said recesses promiscuously in the mold, whereby at least one insert will be temporarily held in place in each magnetic field of said magnets; removing from the mold the excess friction elements loosely disposed therein; inserting an unvulcanized tire in the mold; and subjecting the mold to heat and pressure, whereby the metallic friction elements temporarily retained in the mold will be transferred to and embedded in the finished tire.

3. A mold for vulcanizing an anti-skid pneumatic tire having a plurality of metallic friction elements embedded in the tread portion thereof comprising a substantially cylindrical body portion having a plurality of axially and circumferentially extending embossed portions disposed on the cylindrical body portion and projecting radially inwardly therefrom, said embossed portions intersecting each other and defining recesses which are isolated from each other by said embossed portions whereby said recesses form isolated lugs on the tread of the tire to be molded, a permanent magnet in substantially every recess, said magnets being embedded in said cylindrical body portion and flush with the said cylindrical body portion for creating an individual field of magnetic attraction within each recess whereby metallic frictional elements shorter in length than said recesses are held within said recesses.

4. A mold for vulcanizing an anti-skid pneumatic tire having a plurality of metallic friction elements embedded in the tread portion thereof comprising a substantially cylindrical body portion having a plurality of axially and circumferentially extending embossed portions disposed on the cylindrical body portion and projecting radially inwardly therefrom, said embossed portions intersecting each other and defining recesses which are isolated from each other by said embossed portions and form lugs on the tread of the tire to be molded, a permanent magnet in substantially every recess whereby said recesses form isolated lugs on the tread of the tire to be molded, said magnets being embedded in said cylindrical body portion and flush with the said cylindrical body portion for creating an individual field of magnetic attraction within each recess whereby metallic frictional elements shorter in length than said recesses are held within said recesses, said embossed portions also forming substantially continuous circumferential grooves, a plurality of thin blades spaced relative to each other and extending transversely of said continuous grooves and permanent magnets disposed in said grooves and between said blades, said magnets being flush with the cylindrical body portion of the mold whereby metallic frictional elements shorter in length than the spacing between said blades are temporarily held between said blades.

5. A mold for tire treads comprising a cylindrical body portion having a plurality of axially spaced circumferentially extending embossed portions forming substantially continuous grooves and a plurality of thin blades spaced circumferentially relative to each other and extending transversely of said circumferential grooves, permanent magnets disposed in said grooves and between said blades, said magnets being flush with the cylindrical body portion of the mold for creating an individual field of magnetic attraction between adjacent blades whereby metallic frictional elements shorter in length than the spacing between said blades are temporarily held between said blades.

References Cited in the file of this patent

UNITED STATES PATENTS

| | | |
|---|---|---|
| 1,836,690 | Talbot | Dec. 15, 1931 |
| 2,121,956 | Eger | June 28, 1938 |
| 2,297,923 | Strong et al. | Oct. 6, 1942 |
| 2,465,276 | Ryder | Mar. 22, 1949 |
| 2,618,812 | Hulswit et al. | Nov. 25, 1952 |
| 2,619,678 | Crooker | Dec. 2, 1952 |

FOREIGN PATENTS

| | | |
|---|---|---|
| 556,396 | Great Britain | Oct. 4, 1943 |